United States Patent
Bala et al.

(10) Patent No.: US 10,282,895 B2
(45) Date of Patent: May 7, 2019

(54) TRANSPARENCY PARAMETER DETERMINATION WHEN RENDERING A SCENE FOR OUTPUT IN GRAPHICS PROCESSING SYSTEMS

(71) Applicant: ARM Limited, Cambridge (GB)

(72) Inventors: Sylwester Krzysztof Bala, Cambridge (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 33 days.

(21) Appl. No.: 15/325,700

(22) PCT Filed: Jul. 16, 2015

(86) PCT No.: PCT/GB2015/052054
§ 371 (c)(1),
(2) Date: Jan. 11, 2017

(87) PCT Pub. No.: WO2016/012756
PCT Pub. Date: Jan. 28, 2016

(65) Prior Publication Data
US 2017/0161917 A1  Jun. 8, 2017

(30) Foreign Application Priority Data
Jul. 24, 2014 (GB) .................................. 1413145.2

(51) Int. Cl.
*G06T 15/60* (2006.01)
*G06T 15/04* (2011.01)

(52) U.S. Cl.
CPC ............. *G06T 15/60* (2013.01); *G06T 15/04* (2013.01); *G06T 2210/12* (2013.01); *G06T 2215/12* (2013.01)

(58) Field of Classification Search
None
See application file for complete search history.

(56) References Cited

U.S. PATENT DOCUMENTS 5,870,097 A * 2/1999 Snyder .................. G06T 11/001
345/422
6,563,508 B1 5/2003 Oka
(Continued)

FOREIGN PATENT DOCUMENTS

CA  2737575  10/2012
EP  1508877  2/2005
(Continued)

OTHER PUBLICATIONS

PCT International Search Report and Written Opinion dated Apr. 29, 2016, PCT Patent Application No. PCT/GB2016/050498.
(Continued)

*Primary Examiner* — Hilina K Demeter
(74) *Attorney, Agent, or Firm* — Vierra Magen Marcus LLP

(57) ABSTRACT

In a graphics processing system, a bounding volume (20) representing the volume of a scene to be rendered and a cube texture (30) representing the transparency of the surface of the bounding volume are defined. Then, when the scene is to be rendered for output, a vector (28) from a sampling point (25) being considered to a light source (22) external of the bounding volume is determined and then used to determine how to sample the texture that represents the transparency of the surface of the bounding volume to determine the transparency of the surface of the bounding volume between the sampling point and the light source. The so-determined transparency is then used to simulate the effect of shadows cast by the external light source (22) at the sampling point (25).

19 Claims, 6 Drawing Sheets

(56) References Cited

U.S. PATENT DOCUMENTS

| | | | |
|---|---|---|---|
| 6,876,362 | B1 | 4/2005 | Newhall |
| 6,999,078 | B1 | 2/2006 | Akerman |
| 7,675,518 | B1* | 3/2010 | Miller ..................... G06T 15/06 |
| | | | 345/426 |
| 8,773,433 | B1 | 7/2014 | Smyrl |
| 9,280,848 | B1* | 3/2016 | Chen ..................... G06T 15/506 |
| 9,741,159 | B2* | 8/2017 | Hazel ..................... G06T 15/60 |
| 9,842,424 | B2 | 12/2017 | Hecht |
| 2002/0018063 | A1* | 2/2002 | Donovan ................ G06T 15/50 |
| | | | 345/426 |
| 2003/0052891 | A1* | 3/2003 | Bragg ..................... G06T 15/04 |
| | | | 345/582 |
| 2005/0041023 | A1 | 2/2005 | Green |
| 2005/0093857 | A1 | 5/2005 | Wang |
| 2006/0279570 | A1* | 12/2006 | Zhou ....................... G06T 15/60 |
| | | | 345/426 |
| 2007/0257911 | A1* | 11/2007 | Bavoil .................... G06T 15/60 |
| | | | 345/426 |
| 2008/0024491 | A1 | 1/2008 | Sathe |
| 2009/0213144 | A1 | 8/2009 | Dokken et al. |
| 2010/0134516 | A1* | 6/2010 | Cooper ................. G06T 19/006 |
| | | | 345/592 |
| 2010/0295851 | A1* | 11/2010 | Diamand ............. G06T 15/405 |
| | | | 345/422 |
| 2012/0094773 | A1 | 4/2012 | Suzuki |
| 2015/0228110 | A1 | 8/2015 | Hecht |
| 2015/0269768 | A1 | 9/2015 | Sohn et al. |
| 2017/0069129 | A1 | 3/2017 | Mendez |
| 2018/0033191 | A1 | 2/2018 | Mendez |

FOREIGN PATENT DOCUMENTS

| | | |
|---|---|---|
| GB | 2528655 | 2/2016 |
| GB | 2543766 A | 5/2017 |
| JP | 2011-1138445 A | 7/2011 |
| KR | 100700307 B1 | 3/2007 |
| WO | WO 2008/037599 | 4/2008 |
| WO | 2017072476 A1 | 5/2017 |

OTHER PUBLICATIONS

GB Search Report dated Aug. 25, 2015, GB Patent Application No. GB1503386.3.

GB Search Report dated Aug. 25, 2015, GB Patent Application No. GB1503391.3.

BEHC, "Box Projected Cubemap Environment Mapping," Graphics and GPU Programming, Apr. 20, 2010.

Bjorke, "Image-Based Lighting," GPU Gems, Chapter 19, NVIDIA Corporation, 2004.

"Environment Mapping Techniques," The CG Tutorial, Chapter 7, NVIDIA Corporation, 2003.

Ihrke, et al., "Eikonal Rendering: Efficient Light Transport in Refractive Objects," SIGGRAPH 2007 Conference Aug. 2007.

Sebastien Lagarde, Version 1.28 Living blog on "Image-based Lighting approaches and parallax-corrected cubemap, Siggraph 2012," seblarde.wordpress.com, Sep. 29, 2012.

Sousa, "Generic Refraction Simulation," GPU Gems, Chapter 19, NVIDIA Corporation, 2005.

Search Report dated Feb. 1, 2016, UK Patent Application No. GB1515723.3.

Engelhardt, "Epipolar Sampling for Shadows and Crepuscular Rays in Participating Media with Single Scattering," Proceedings of the 2010 Symposium on Interactive 3D Graphics and Games, Feb. 2010.

Kenny Mitchell, "Volumetric Light Scattering as a Post-Process," GPU Gems 3, Feb. 2008, NVIDIA Corporation, http://http.developer.nvidia.com/GPUGems3/gpugems3_ch13.html.

Skals, "Real-time Scattering," Feb. 28, 2012, www2.imm.dtu.dk/pubdb/views/.../imm6267.pdf.

Toth, et al., "Real-time Volumetric Lighting in Participating Media," The Eurographics Association Mar. 2009, http://sirkan.iit.bme.hu/~szirmay/lightshaft_link.htm.

Mitchell, "Light Shafts: Rendering Shadows in Participating Media," ATI Research, Inc., Game Developers Conference, Mar. 2004.

Dobashi, et al., "Interactive Rendering Method for Displaying Shafts of Light," Oct. 2000, http://ime.ist.hokudaLac.jp/~doba/papers/pg00.pdf.

Prast, et al., "Caustics, Light Shafts, God Rays," Institute of Computer Graphics and Algorithms, Vienna, University of Technology, Feb. 2013, https://old.cg.tuwien.ac.at/research/publications/2013/Prast_Stefanie_2013-CLG/Prast_Stefanie_2013-CLG-Thesis.pdf.

Keller, et al., "Interleaved Sampling," Proceedings of the 12th Eurographics Workshop on Rendering Techniques, London, UK, Jun. 2001, http://cs.ubc.ca/labs/imager/tr/2001/keller2001a/keller.2001a.pdf.

Shin, et al., "Rendering Particles in a Shaft of Light," Jul. 2011, http://www.csee.umbc.edu/~olano/class/635-11-2/shin7.pdf.

Nilsson, "Two Hybrid Methods of Volumetric Lighting," Lund University, Mar. 20, 2008, http://fileadmin.cs.lth.se/graphics/theses/projects/volumetric/thesis.pdf.

"White Paper: Volume Light," Nvidia Corporation, Jan. 2008, http://developer.download.nvidia.com/SDK/10.5/direct3d/Source/VolumeLight/doc/VolumeLight.pdf.

Notice of Allowance dated Jan. 23, 2018, in U.S. Appl. No. 15/247,272.

Nishita, "A Shading Model for Atmospheric Scattering Considering Luminous Intensity Distribution of Light Sources", ACM, Computer GRaphics, vol. 21, No. 4, Jul. 1987, pp. 303-310.

U.S. Appl. No. 15/770,322, filed Apr. 23, 2018.

GB Combined Search and Examination Report dated Feb. 25, 2016, GB Patent Application GB1518908.7.

PCT International Search Report dated Nov. 7, 2016, PCT Patent Application No. PCT/GB2016/052432.

PCT Written Opinion of the International Searching Authority dated Nov. 7, 2016, PCT Patent Application No. PCT/GB2016/052432.

Laszlo Szirmay-Kalos, et al., "Approximate Ray-Tracing on the GPU with Distance Imposters," Computer Graphics Forum, vol. 24 No. 3, Sep. 1, 2005.

Laszlo Szirmay-Kalos, et al., "Specular Effects on the GPU: State of the Art," Computer Graphics Forum, vol. 28 No. 6, Sep. 1, 2009.

Roberto Lopez Mendez, "Reflections based on local cubemaps in unity," ARM Mali Graphics 2014, Aug. 7, 2014.

Sebastien Lagarde et al., "Local Image-based Lighting with Parallax-corrected Cubemap," GamesConnection, Nov. 30, 2012.

Shengying Li, et al., "Real-time Reflection using Ray Tracing with Geometry Field," Eurogrphics 2006 Conference, Short Papers, Sep. 4-8, 2006, Vienna, Austria.

PCT International Search Report dated Dec. 17, 2015, PCT Patent Application PCT/GB2015/052054.

PCT Written Opinion of the International Searching Authority dated Dec. 17, 2015, PCT Patent Application PCT/GB2015/052054.

Friedrich A. Lohmueller: "Textures with POV-Ray—Transparency mapping I", Jan. 20, 2013 (Jan. 20, 2013), XP055235051, Retrieved from the Internet: URL:https://web.archive.org/web/20130120200610/http://f-lohmueller.de/pov_tut/tex/tex_885e.htm, the whole document figures 1-3.

Friedrich A. Lohmueller: "Textures with POV-Ray—Transparency mapping II", Jan. 20, 2013 (Jan. 20, 2013), XP055235064, Retrieved from the Internet: URL:https://web.archive.org/web/20130120200631/http://f-lohmueller.de/pov_tut/tex/tex_886e.htm—the whole document.

Sebastien Lagarde, et al.: "Local Image-based Lighting with Parallax-corrected Cubemap", GamesConnection, Nov. 30, 2012 (Nov. 30, 2012), XP055235164, Retrieved from the Internet: URL:https://seblagarde.files.wordpress.com/2012/08/parallax_corrected_cubemap-gameconnection2012.pdf—the whole document p. 23.

Sebastien Lagarde, et al.: "Local image-based lighting with parallax-corrected cubemaps", SIGGRAPH '12 ACM SIGGRAPH 2012 Talks, ACM, 2 Penn Plaza, Suite 701 New York NY 10121-0701 USA, Aug. 5, 2012 (Aug. 5, 2012), p. 1, XP058008298, DOI: 10.1145/23430452343094 ISBN: 978-1-4503-1683-5 the whole document abstract.

GB Search Report dated Jan. 21, 2015, GB Patent Application No. GB1413145.2.

(56) References Cited

OTHER PUBLICATIONS

Bunnell, et al., Chapter 11. Shadow Map Antialiasing, Sep. 2007, Retrieved from the Internet: URL: http://http.developer.nvidia.com/GPUGems/gpugems_ch11.html.
Bjorke, Chapter 19. Image Based Lighting, Sep. 2007, Retrieved from the Internet: URL: http://http.developer.nvidia.com/GPUGems/gpugems_ch19.html.
Tutorial on Shadow Mapping, Paul's Projects, 2002/2003 Retrieved from the Internet: URL: http://www.paulsprojects.net/tutorials/smt/smt.html.
Everitt, "Projective Texture Mapping," NVIDIA, Dec. 2015, Retrieved from the Internet: URL: www.cse.unsw.edu.au/~cs9018/readings/projective_texture_mapping.pdf.
Notice of Allowance dated Jun. 15, 2018, U.S. Appl. No. 15/247,272.
Office Action dated Nov. 9, 2018, U.S. Appl. No. 15/551,846.

\* cited by examiner

TRANSPARENCY PARAMETER DETERMINATION WHEN RENDERING A SCENE FOR OUTPUT IN GRAPHICS PROCESSING SYSTEMS

BACKGROUND

The technology described herein relates to graphics processing systems and in particular to methods of and apparatus for taking account of the effect of shadows when rendering images for display.

When rendering images, such as output frames, for display in graphics processing systems, it is often desirable to be able to take account of the effect of shadows in the scene being rendered. Various rendering techniques have therefore been developed to try to do this.

One such technique is so-called "shadow mapping". In this technique a "shadow map" that is indicative of the depth from the light source to the object that is casting the shadow at each sampling point is derived (e.g. in a first rendering pass), and then used when rendering the output frame to determine if the sampling positions are in shadow or not (by comparing the shadow map depth with the depth of the geometry at the sampling point in question to determine if the geometry is in front of or behind the shadow casting object (and so will be in shadow or not)).

While shadow maps can be an effective technique for allowing the effect of shadows to be taken account of when rendering images, the need to first prepare, and then store and use, a shadow map in these arrangements means that using shadow maps can become very expensive (e.g. in terms of memory and bandwidth resources), particularly if there are plural light sources that need to be considered. It is also necessary to regenerate the shadow map(s) whenever the light or viewpoint (camera) position changes (which can happen each frame).

The Applicants believe therefore that there remains scope for improved techniques for rendering shadows in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
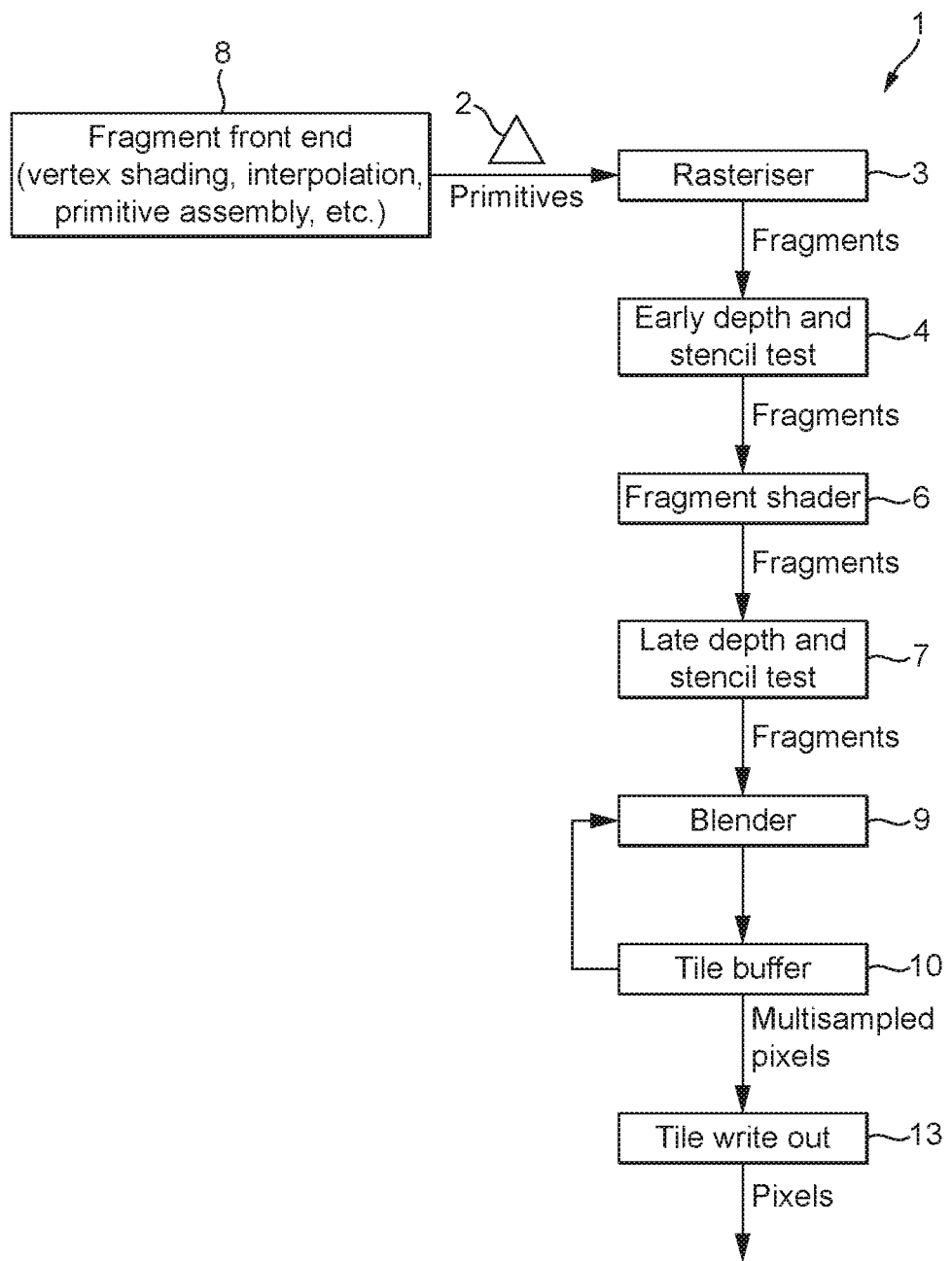
FIG. 1 shows schematically a graphics processing pipeline that can be operated in the manner of the technology described herein.

A first embodiment of the technology described herein comprises a method of operating a graphics processing system when rendering a scene for output, in which a bounding volume representative of the volume of all or part of the scene to be rendered is defined; the method comprising:

for at least one sampling point on or within the bounding volume, determining a transparency parameter indicative of the amount of shadow cast on the sampling point by a light source that is external to the bounding volume by:

determining the position on the bounding volume intersected by a vector from the sampling point to the light source;

using the intersection position to determine a vector to be used to sample a graphics texture that represents the transparency of the surface of the bounding volume in the scene; and using the determined vector to sample the graphics texture to determine a transparency parameter value for the light source for the sampling point.

A second embodiment of the technology described herein comprises a graphics processing pipeline comprising:

a plurality of processing stages, including at least a rasteriser that rasterises input primitives to generate graphics fragments to be processed, each graphics fragment having one or more sampling positions associated with it, and a renderer that processes fragments generated by the rasteriser to generate output fragment data;

and wherein the graphics processing pipeline is configured to, when rendering a scene for output for which a bounding volume representative of the volume of all or part of the scene to be rendered is defined and in which an external light source that could cast shadows in the bounding volume is present:

for at least one sampling point on or within the bounding volume, determine a transparency parameter indicative of the amount of shadow cast on the sampling point by a light source that is external to the bounding volume by:

determining the position on the bounding volume intersected by a vector from the sampling point to the light source;

using the intersection position to determine a vector to be used to sample a graphics texture that represents the transparency of the surface of the bounding volume in the scene; and using the determined vector to sample the graphics texture to determine a transparency parameter value for the light source for the sampling point.

The technology described herein is directed to a method of and apparatus for taking account of the effect of shadows when rendering a scene for output and in particular in the situation where there is a light source that is external to a defined bounding volume within the scene. To determine the effect of shadows cast by that light source into the bounding volume, a texture representative of the transparency of the surface of the bounding volume is used, with the texture being sampled using a vector derived from the vector between the sampling position being considered and the light source.

As will be discussed further below, the Applicants have recognised this arrangement can be used to simulate the effect of shadows cast by light sources external to a bounding volume using a single "static" graphics texture that represents the transparency of the surface of the bounding volume. This then means that, for example, the same graphics texture can be used for multiple frames, even if the viewpoint (camera) position and/or the position of the light changes. Also, that same texture can be used to assess the shadows cast by all the light sources that are external to the bounding volume (rather than there needing to be, e.g., a separate texture per light source). This is in contrast to, for example, conventional shadow mapping arrangements, in which the shadow maps have to continuously be regenerated, e.g. for each frame, and for each light source.

Because the technology described herein uses a "static" texture to simulate the shadow effect, rather than using "dynamic" textures as in conventional shadow mapping, that also means that the texture of the technology described herein can be generated in much higher quality, and using more sophisticated effects, such as blurring. The texture can, for example, be generated "offline" and subjected to non-real-time optimisations, and then provided for use by the graphics processing system. This is in contrast to the case for conventional shadow mapping, for example, where because the shadow maps must be regenerated, e.g. for each frame, they must be generated in low resolution/low quality forms in order to maintain the speed necessary for real-time rendering. The technology described herein does not suffer from this disadvantage, and so the textures that are used to simulate shadow effects may be generated to have a much higher quality, thereby providing higher quality shadowing effects, such as "soft shadows". Because a single, "static" texture can be used in the technology described herein for a given bounding volume, it is also possible to provide the texture in a compressed form, if desired, thereby providing bandwidth and memory savings.

The technology described herein can accordingly significantly reduce the memory and bandwidth required for handling at least certain shadowing situations as compared to conventional shadow handling techniques such as shadow mapping, while also providing enhanced rendering quality (and facilitating, e.g., the rendering of "soft shadows").

The technology described herein is concerned with the situation where shadows are cast within a bounding volume for a scene by a light source that is external to the bounding volume. The bounding volume could represent the entire scene that is being rendered (and in one embodiment this is the case), but it would also be possible for the bounding volume to represent only a part of the scene. The bounding volume may, for example, represent a room.

The bounding volume can be defined in any desired and suitable manner. It is in an embodiment defined in world space. It can take any suitable and desired form, but is in an embodiment in the form of a bounding box (a cube). Other arrangements for the bounding volume would, of course, be possible.

The graphics textures that represents the transparency of the surface of the bounding volume can take any suitable and desired form. In an embodiment it is in the form of a texture that is used for environment mapping, such as a cube texture (cube map) or a sphere texture (sphere map).

Thus, in an embodiment, the texture that represents the transparency of the surface of the bounding volume comprises a texture that indicates and stores for points on a surface that surrounds a reference position within the volume that the texture encompasses, a transparency value for each point, with the texture then being sampled based on a vector (direction) from the reference position for the texture (that the texture is defined with respect to).

In other words, the texture in an embodiment stores a transparency value for respective directions from a reference position (point) within the volume that the texture represents, and is sampled by determining a direction from the reference position (point) within the texture to a position on the surface that the texture represents.

The reference position (point) within the texture that the texture is defined (and sampled) with respect to is in an embodiment at the centre of the volume that the texture encompasses, but other arrangements would, of course, be possible, if desired.

The texture representing the transparency of the surface of the bounding volume is in an embodiment configured to correspond to the bounding volume for the scene. Thus, for example, where the bounding volume is in the form of a cube, the texture is in an embodiment in the form of a cube texture (a cube map). In an embodiment, the texture is a cube texture (a cube map).

Correspondingly, the texture in an embodiment has a resolution that will be suitable for the anticipated size of the bounding volume that it is to be used with (although this is not essential, and the texture could, e.g., be scaled for use, if required).

The texture should, and in an embodiment does, store transparency values (alpha values) indicative of the transparency of the surface of the bounding volume in the scene in the relevant direction from the reference point within the volume that the texture is defined in relation to. Thus, for example, where the bounding volume surface is to be opaque in a given direction, the texture transparency (alpha) values for that direction from the reference point should be set to a value to indicate that the surface is opaque in that direction (e.g. "1"). Correspondingly, for those directions from the reference point where the surface is completely transparent, a transparency (alpha) value indicative of complete transparency (e.g. "0") should be stored in the texture. For semi-transparent surface regions, transparency (alpha) values indicative of semi-transparency, i.e. between "0" and "1", can be used. In this way, the texture can be used to represent the full range of transparency from completely transparent to completely opaque. (The alpha values in the texture will, as will be appreciated by those skilled in the art, essentially represent how much light from the light source is blocked by the surface (the shadow intensity) at the point (from the direction) in question, i.e. how much of a shadow is cast by the surface blocking the light source at the point in question.)

The texture could store the transparency values alone (i.e. be a single channel texture, storing a single transparency (alpha) channel only). Alternatively, the texture could also store other data channels, such as colour channels (e.g. be an RGBα texture (and in an embodiment, this is done)). In this case, the non-transparency (alpha) data channels could be used to store an environment texture that is to be used for different purposes. For example, an RGBα texture could be used to store a texture to be used in the manner of the technology described herein in the alpha channel, and also to store a second texture for other purposes (e.g. for reflection mapping) in the RGB colour channels. This would then allow the same, e.g. cube, texture to be used for rendering both reflections and shadows.

In an embodiment where the texture also includes colour channels, those colour channels are also used in the method of the technology described herein, for example as a further, colour, parameter to be used when calculating the shadow effect. This would then allow the effect of tinted (coloured) semi-transparent surfaces to be simulated and taken into account when calculating the effect of shadows within the bounding volume.

The position on the bounding volume intersected by a vector from the sampling point (for which the transparency parameter is required) to the light source (for which the transparency parameter is being determined) can be determined as desired. In an embodiment, the vector from the sampling point on or within the bounding volume to the light source position (in world space) is determined, and the intersection point on the bounding volume of that vector from the sampling point to the light source is then determined.

These processes can be carried out by any desired and suitable stage or component of the graphics processing pipeline.

In an embodiment, the vectors to the light source from the vertices of the primitive that the sampling point being considered relates to are determined, and then the vector from the sampling point to the light source is determined by appropriate interpolation of those vertex to light source vectors. The vertex to light vectors are in an embodiment calculated in the world space. In an embodiment, for each vertex, the vector from the vertex to the light source position is determined. The vector from the sampling point to light source is in an embodiment then determined by appropriate interpolation of the vertex to light source vectors.

The vertex to light source vectors are in an embodiment determined by a vertex shading stage of the graphics processing pipeline, in an embodiment by that stage executing an appropriate vertex shading program (vertex shader), and then output by the vertex shading stage for use by other stages of the graphics processing pipeline. The interpolation of the vertex to light vectors to provide the sampling point to light vector can be performed by any appropriate stage of the graphics processing pipeline, such as, and in an embodiment, an appropriate primitive setup stage of the graphics processing pipeline that otherwise performs and calculates interpolation parameters required for a primitive being processed.

The sampling point to light source vector (whether generated by interpolation from vertex to light source vectors or otherwise) can be used to determine the position on the bounding volume intersected by that vector from the sampling position to the light source again by any desired and suitable stage or component of the graphics processing pipeline. In an embodiment, this is done by a fragment shading stage (by a fragment shader) of the graphics processing pipeline, again in an embodiment by that stage executing an appropriate fragment shading program (fragment shader) to calculate the intersection point. The fragment shader will use the sampling point to light source vector and information about the bounding volume as inputs to this process.

In an embodiment, the determination of the position on the bounding volume intersected by a vector from the sampling position to the light source is determined by a fragment shading stage of the graphics processing pipeline, in an embodiment by that stage executing an appropriate fragment shading program (fragment shader) that can calculate the intersection point. Other arrangements, such as this determination being done by a vertex shading stage of the graphics processing pipeline would also be possible, if desired.

The determined intersection position on the bounding volume can be used to determine the vector to be used to sample the transparency representing graphics texture in any suitable and desired manner. For example, the vector from the sampling position to the intersection point could simply be used as the vector that is used to sample the graphics texture.

However, the Applicants have recognised that where the graphics texture is defined with reference to a reference position (e.g. the centre point) within the volume that the graphics texture corresponds to, then simply using the vector from the sampling position of interest to the intersection point on the bounding volume will not always sample the graphics texture correctly. Thus, in an embodiment, the sampling process involves accounting for (compensating for) the fact that the texture is defined with reference to a reference point that may not correspond to the sampling position being considered.

This compensation can be performed as desired but in an embodiment, the vector from the reference position that the texture is defined with respect to, to the determined intersection point on the bounding volume is determined, and then that vector is used to sample the transparency-indicating texture. This will ensure that the correct position in the texture is sampled, even if the sampling position does not correspond to the reference position that the texture is defined with respect to. It, in effect, applies a "local" correction to the vector from the sampling position being considered to the light source.

In other words, the determined intersection position on the bounding volume is used to determine a vector from the texture reference position (e.g. centre point) to the determined intersection point, and then that vector from the reference position to the determined intersection point is used to sample the transparency-indicating texture.

The transparency-indicating texture should then be sampled appropriately, using the determined "sampling" vector, to retrieve the desired transparency value.

The transparency-indicating texture can be sampled in any desired and suitable manner. For example, appropriate filtering (interpolation) processes, such as bilinear filtering, can be used when sampling the texture, if desired. Similarly, in the case where the transparency-indicating texture is provided as a set of mipmaps, the sampling process is in an embodiment configured to filter (interpolate) the mipmaps to provide the sampled texture value, for example (and in an embodiment) using tri-linear filtering.

Where the texture is in the form of a set of mipmaps, the sampling process in an embodiment also comprises determining the mipmap level or levels (the level of detail) at which the transparency-indicating texture should be sampled (and then sampling the so-determined mipmap level(s) for the transparency-indicating texture).

The mipmap level (level of detail) to use is in an embodiment determined based on the distance from (the length of the vector from) the sampling point being considered to the intersection position on the bounding volume of the vector from that sampling point to the light source.

Other arrangements would, of course, be possible.

These processes can again be carried out by any desired and suitable stage or component of the graphics processing pipeline. In an embodiment they are performed by a fragment shading stage (a fragment shader) of the graphics processing pipeline, in an embodiment by executing an appropriate fragment shading program. They may also or instead be performed at least in part by an appropriate texture mapping stage of the graphics processing pipeline, if desired.

Once the texture has been sampled, the sampled transparency value for the surface of the bounding volume can then be used as desired, e.g. in a (conventional) lighting calculation that determines the intensity (and e.g. colour) of the light falling on the sampling point from the external light source being considered.

The sampled transparency value for a sampling point can be used as desired to simulate the effect of the shadows at the sampling point. The determined transparency value is in an embodiment used to modulate the light source at the sampling position when determining the output, rendered, colour to be used for the sampling position. Thus, the sampled transparency (alpha) value from the texture is in an embodiment used to modulate the determined amount of light falling on the sampling position in question from the light source being considered. For example, the alpha value could be used to as or to derive a multiplying factor.

Thus, in an embodiment, the method of the technology described herein further comprises using (and the graphics processing pipeline of the technology described herein is further configured to use) the determined transparency value for the sampling point when rendering an output version of the sampling point, and in an embodiment to modulate the effect of the light source in question at the sampling point.

These processes can again be carried out by any desired and suitable stage or component of the graphics processing pipeline. In an embodiment they are performed by the renderer of the graphics processing pipeline, and in an embodiment by a fragment shading stage of the graphics processing pipeline (again in an embodiment by executing an appropriate fragment shading program that performs the desired lighting calculations).

Any or all of the above processes could be performed for sampling points individually, or some or all of them could be performed for sets of plural sampling points (which would then have the effect of performing the process for the sampling points within the set that is being considered). For example, where the graphics processing pipeline operates on fragments that each represent a set of plural sampling positions, the process of the technology described herein could be performed on a per-fragment basis, rather than individually for each sampling point that a fragment represents (and in an embodiment this is what is done). In this case, there would accordingly be, e.g., a single transparency value determined for a fragment, which would then be used for each sampling point that the fragment is being used to render.

As will be appreciated from the above, an advantage of the technology described herein is that the technique can be used to calculate shadows irrespective of the position of the light source that is external to the bounding volume. Furthermore, this means that the same graphics texture representing the transparency of the surface of the bounding volume can be used for different external light sources.

Thus the technology described herein can be extended to an arbitrary number of lights that are external to the bounding volume. In this case, the process of the technology described herein to determine a transparency value at a sampling point for a light source should be, and in an embodiment is, repeated for each external light source that could cast a shadow in the bounding volume. A separate transparency value and subsequent light source contribution is in an embodiment determined for each light source being considered, with the separate light source values then being combined appropriately to determine the overall effect of the light sources at the sampling point in question.

Thus, in an embodiment, the process of the technology described herein is repeated for each of plural light sources external to the bounding volume (and in an embodiment for all of the light sources external to the bounding volume), for example to determine the effects of shadows cast by two or more external light sources at a sampling point within or on the bounding volume. Where plural external light sources are being considered, in an embodiment the operation in the manner of the technology described herein is performed for each light source separately, such that a transparency (alpha) parameter and then a corresponding lighting calculation is performed for each light source separately, with the resulting values for the respective separate light sources then being combined appropriately to determine the overall effect of the plural light sources at the sampling point.

It will also be appreciated that although the technology described herein has been described above with particular reference to determining a transparency parameter at a given sampling point on or within the bounding volume in question, the technique of the technology described herein can be, and in an embodiment is, used for plural sampling points on and within the bounding volume, and in an embodiment for each sampling point on or within the bounding volume that needs to be considered when rendering the scene.

Thus, the process is in an embodiment repeated for each sampling point for a primitive that is on or within the bounding volume that is being considered, and for each primitive that is on or within the bounding volume that is being considered.

Similarly, the process is in an embodiment repeated for plural scenes in a sequence of scenes being rendered, e.g., and in an embodiment, for each frame of a sequence of frames to be rendered, that includes an external light source or sources that could cast shadows.

The Applicants have further recognised that if the surface that a sampling point on or within the bounding volume relates to faces away from the light source being considered, then that sampling position will be in shadow irrespective of the transparency of the surface of the bounding volume between the light source and the sampling position.

Thus, in an embodiment, the method of the technology described herein comprises checking (and the graphics processing pipeline is configured to check) whether the sampling point lies on a surface that is facing away from the light source being considered (lies on a back-facing surface relative to the light source being considered). Then if it is determined that the sampling point does lies on a back-facing surface, the sampling point is treated as being completely shadowed from the light source, and the transparency indicating texture is not sampled.

The determination of whether a surface is back-facing or not can be performed as desired. In an embodiment, the normal vector for the surface in question (i.e. for the surface that the sampling position lies on) is considered and used for this purpose. In an embodiment, the angle between the normal vector and the vector from the sampling point being considered to the light source is used for this purpose. In an embodiment, if the angle between the surface normal and the vector from the sampling point to the light source is greater than 90° (is outside the range +90° to −90°), then the surface is determined to be back-facing and so the sampling point is assumed to be in complete shadow for the light source in question.

In an embodiment the normal vector for the primitive that the sampling point is a part of is used as the normal vector for the surface in question, and is, accordingly, tested to determine whether the sampling point will definitely be in shadow or not. Thus, in an embodiment, the process comprises using the normal vector for the primitive that the sampling point belongs to test whether the sampling point is facing away from or towards the light source being considered. In an embodiment if the determination indicates that the sampling point is part of a back-facing primitive (with respect to the light source in question), then the transparency indicating texture is not sampled.

The test to determine whether the sampling point lies on a back-facing surface (primitive) or not could be performed at any desired and suitable stage of the process. Thus, it could, for example, be performed before the process of sampling the graphics texture to determine the transparency value is performed, and, e.g., before determining the position of the bounding volume intersected by a vector from the sampling point to the light source. It is in an embodiment performed at a stage that should allow at least some, but not necessarily all, of the operations for sampling the graphics texture to determine the transparency value to be omitted (avoided) if it is determined that the sampling point lies on a back-facing surface (is part of a back-facing primitive) relative to the light source in question.

In an embodiment, particularly where the test uses a normal vector, this test is performed after the sampling position to light vector has been determined, but before the position on the bounding volume intersected by that vector is determined (and such that the position on the bounding volume intersected by the vector from the sampling point to the light source will not be determined if the "back-facing" test indicates that the sampling point relates to a back-facing primitive for the light source in question).

These processes can again be carried out by any desired and suitable stage or component of the graphics processing pipeline. In an embodiment, the normal vector for the surface (or the primitive) that the sampling point relates to is determined by a vertex shading stage (vertex shader) of the graphics processing pipeline, again in an embodiment by executing an appropriate vertex shading program. That normal vector is in an embodiment then stored for use by subsequent stages of the graphics processing pipeline. The test of whether the sampling point belongs to a back-facing surface (primitive) using the normal vector is in an embodiment then performed by a fragment shading stage of the graphics processing pipeline, again in an embodiment by executing an appropriate fragment shading program. This operation will use the normal vector and the interpolated sampling point to light source vector from the vertex shading stage as inputs.

It would also be possible to perform some form of smoothing operation around the region where a surface moves from facing towards the light source to facing away from it, such that the transition from light to shadow is shown more gradually, if desired. This operation could again, e.g., be based on the angle of the normal to the surface at the sampling position in question and the vector from the sampling position to the light source. For example, in the case of a curved surface, there may be a sequence of sampling positions where the angle progressively moves from less than 90° to greater than 90° (indicating that the sampling position is in shadow), and a smoothing process could be applied to those sampling positions.

It will be appreciated from the above that the technique of the technology described herein is particularly applicable to situations where it is desired to determine and simulate the effect of shadows from a light source that is external to a bounding volume that represents all or part of a scene to be rendered. Thus the technology described herein is particularly suitable for, and in an embodiment is used for, determining and simulating the effect of shadows for environments within a scene, such as rooms, but is less useful for (and is in an embodiment not used for) determining shadows cast by close and/or dynamic objects in a scene. It will also not be so suitable for (and in an embodiment is not used for) determining the effect of shadows cast by lights that are within the bounding volume being considered. (However, it can be used for dynamic shadows, such as for example in the case where the camera (view) position and/or external light source's position moves between successive frames, as the transparency texture (e.g. cubemap) can be used for any light source position that is external to the bounding volume.)

Where there are other light sources that the technique of the technology described herein cannot or is preferred not to be used for, then other, e.g. known, shadow simulation techniques, such as shadow maps, can be used for those light sources. Thus, in an embodiment, the technique of the technology described herein can be, and is in an embodiment, used in combination with one or more other techniques for determining and simulating the effect of shadows. Thus, for example, in the case of a scene that has a light source that is external to the scene bounding volume and a light source that is inside the scene bounding volume, the technique of the technology described herein is in an embodiment used to determine and simulate the effect of shadows cast by the external light source, but a different shadow determination and simulation technique is in an embodiment used for the light source that is inside the bounding volume. This arrangement can then be repeated for each and every light source that affects the scene.

The technology described herein also extends to the generation of textures representing the transparency of the surface of bounding volumes for a scene and to the textures themselves. It may be, for example, that the textures would be generated (and stored) separately, and/or in advance, and then, e.g., provided to a graphics processor for use. The technology described herein extends to these activities, as well as to the use of the transparency-indicating textures for rendering shadows within a bounding volume for a scene being rendered.

Thus, another embodiment of the technology described herein comprises a method of generating a texture for use in a graphics processing system when rendering a scene for output, the method comprising:

generating a graphics texture comprising an array of texture texels;

setting the texel values in the texture such that they each store a transparency value representative of the transparency of the surface of a bounding volume that the texture represents in a given direction from a reference position that the texture is to be sampled with respect to; and storing data representing the texel values of the texture and indicating the reference position that the texture is to be sampled with respect to.

Another embodiment of the technology described herein comprises an apparatus for generating a texture for use in a graphics processing system when rendering a scene for output, the apparatus comprising processing circuitry configured to:

generate a graphics texture comprising an array of texture texels;

set the texel values in the texture such that they each store a transparency value representative of the transparency of the surface of a bounding volume that the texture represents in a given direction from a reference position that the texture is to be sampled with respect to; and store data representing the texel values of the texture and indicating the reference position that the texture is to be sampled with respect to.

Another embodiment of the technology described herein comprises a texture for use in a graphics processing system when rendering a scene for output, the texture comprising:

an array of texture texels, in which:

the texel values are set such that they each store a transparency value representative of the transparency of the surface of a bounding volume that the texture represents in a given direction from a reference position that the texture is to be sampled with respect to.

As will be appreciated by those skilled in the art, these embodiments of the technology described herein can, and in an embodiment do, include any one or more or all of the optional features described herein, as appropriate.

Thus, for example, the texture is in an embodiment in the form of a cube texture (a cube map). Similarly, in an embodiment, as well as storing an alpha (transparency) value channel, the texture also stores colour channels whose values are set according to the colour of the surface of the bounding volume that the texture is to be used in relation to.

The texture is in an embodiment generated by rendering an image of a surface for the bounding volume from the viewpoint of the reference position for the texture (from the texture reference position). The apparatus may, e.g., comprise any suitable processor that can do this, such as a graphics processor, a CPU, etc.

The generated texture is in an embodiment stored, e.g. on an appropriate portable storage medium, such as a DVD, or in memory, for future use by a graphics processing pipeline, when it is desired to use the texture when rendering, e.g., an image.

In an embodiment, the texture is stored (encoded) as a set of mipmaps (i.e. where multiple versions of the original texture each having different levels of detail (resolution) are stored for use).

The texture is in an embodiment generated in advance of its requirement, e.g. "offline" (rather than being generated in "real-time" as and when it is needed).

In an embodiment, the texture is subject to one or more processing operations after it has been generated (and before it is stored for use), such as, and in an embodiment, one or more filtering processes, such as having one or more convolution filters applied to it. In an embodiment the texture is subjected to one or more of: blurring; brightness processing; contrast processing (e.g. enhancement); sharpening, etc. In an embodiment, the texture is subjected to one or more non-real-time optimisations. (As discussed above, a particular advantage of the technology described herein is that because the texture that is used to represent the transparency values is, in effect, a "static" texture, it does not need to be generated in real-time, and can therefore, accordingly, be subjected to one or more non-real-time optimisations, if desired.)

In an embodiment, the texture is also compressed before it is stored. Any suitable texture compression process can be used for this.

In an embodiment, as well as generating the texture, the bounding volume that the texture represents (is to be used with) is also generated and stored. This bounding volume should, and in an embodiment does, represent the volume of all or part of a scene to be rendered that the texture is to be used in conjunction with.

In an embodiment data defining the bounding volume that the texture is to be used in conjunction with is generated and stored in association with (associated with) the texture. The bounding volume is in an embodiment defined in world space and is in an embodiment aligned to the transparency-indicating texture. Again, this bounding volume information can be subject to any desired post-processing operations, such as compression, if desired.

As discussed above, the transparency indicating texture is in an embodiment generated by rendering an image that will represent the surface of the bounding volume from the viewpoint of the reference position for the texture. This is in an embodiment done by sampling respective positions on the surface (the image representing the surface) for respective positions on the bounding volume (in the relevant direction from the reference position for the texture). In this process, as the bounding volume will typically be an approximation of the actual scene (e.g. room) being defined, the bounding volume may not match exactly to the surface of the scene (e.g. room) being defined (e.g. where the, e.g. walls of the room may be uneven or have surface roughness). To allow for this when generating the texture, the points of the surface that are sampled for the texture (for each texel), can be, and are in an embodiment, allowed to, fall on, outside of or inside the bounding volume (rather than the sampling points being constrained to be on the walls of the bounding volume). This will avoid holes being introduced within the texture where the bounding volume does not match exactly with the scene geometry. The surface is in an embodiment sampled at a position as close to the corresponding position on the bounding volume (in the relevant direction from the reference position for the texture) as possible, as the further a sampling point is from the bounding volume, the greater the error that will be introduced when using the texture, particularly when making a local correction. Accordingly, the bounding volume is in an embodiment defined such that it matches the scene (the surface defining the scene) closely (in an embodiment as closely as possible), such that the texture can be generated using samples near to (as near as possible to) the walls of the bounding volume.

In an embodiment, plural textures, and, in an embodiment, corresponding bounding volumes, are generated and stored, e.g. for respective scenes that is anticipated may be displayed when executing the application, e.g. game, that the textures and scenes relate to. For example, where a game will include plural scenes, such as rooms, that could have external light sources, in an embodiment respective transparency-indicating textures and bounding volumes are generated for each scene (e.g. room) that could fall to be displayed when the game is played. The textures and bounding volumes can then be stored, e.g., with the remaining game data for use when the game is being executed.

The technology described herein can be used in and with any suitable and desired graphics processing system and pipeline.

The technology described herein is particularly suitable for use with tiled renderers (tile-based graphics processing systems). Thus, in an embodiment, the graphics processing pipeline is a tiled-based graphics processing pipeline.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent, as is known in the art. These rendering processes may include, for example, fragment shading, blending, texture-mapping, etc.

In an embodiment the renderer is in the form of or includes a programmable fragment shader.

The graphics processing pipeline may also contain any other suitable and desired processing stages that a graphics processing pipeline may contain such as an early depth (or an early depth and stencil) tester, a late depth (or depth and stencil) tester, a blender, a tile buffer or buffers, a write-out unit, etc.

The graphics processing pipeline in an embodiment also comprises, and/or is in communication with, one or more memories and/or memory devices that store the data described herein, such as the transparency-indicating textures, scene bounding volumes, etc., and/or that store software for performing the processes described herein. The graphics processing pipeline may also be in communication with the host microprocessor, and/or with a display for displaying images based on the data generated by the graphics processing pipeline.

The graphics processing pipeline in an embodiment includes at least local memory, such as (on-chip) buffer or buffers, and/or register(s), that can be used to store the data required for the transparency parameter determination process and the determined transparency parameters. Where present, the tile buffers can be used for this purpose, if desired. The graphics processing pipeline can in an embodiment also cache sampled transparency values for future use, if desired.

The technology described herein can be used for all forms of output that a graphics processing pipeline may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the technology described herein. The graphics processing pipeline 1 is a tiled deferred renderer with a fully programmable GPGPU context, for example a renderer which executes partly via Direct Compute, OpenCL, CUDA, etc.

As the graphics processing pipeline 1 shown in FIG. 1 is a tile-based renderer, it will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation operations (not shown), vertex shading, interpolation and a primitive set-up stage (not shown) to set-up the primitives to be rendered, in response to the commands and vertex data provided to the graphics processor, as is known in the art.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer will store, as is known in the art, colour and depth buffers that store appropriate colour, etc., values or a Z-value, respectively, for each sampling position that the buffers represent (in essence for each sampling position of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 that allow the effect of shadows in an image being rendered to be simulated in accordance with embodiments of the technology described herein will now be described.

The present embodiments operate to simulate the effect of shadows cast within a defined volume for a scene by light sources that are external to that bounding volume.

Figure 2:
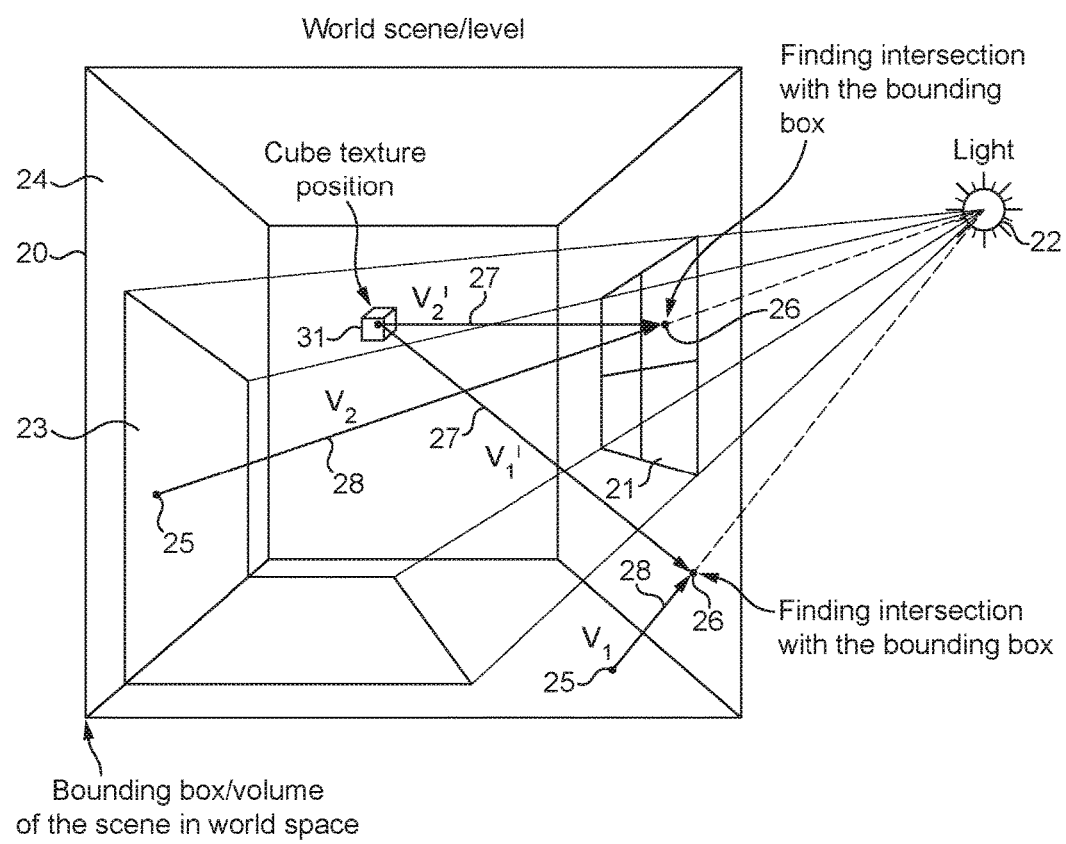
FIG. 2 shows schematically the operation of an embodiment of the technology described herein.

FIG. 2 illustrates this and shows an exemplary bounding volume 20 in the form of a bounding box that is defined in world space, that represents a volume within the scene being rendered. In the present embodiment it is assumed that the bounding volume 20 corresponds to the entire scene and represents e.g., a room, but other arrangements would, of course, be possible. As can be seen in FIG. 2, the bounding volume 20 is assumed to have a window 21, but otherwise opaque walls.

It is also assumed, as shown in FIG. 2, that there is a light source 22 external to the bounding volume 20 that will shine through the window 21 and accordingly cast light 23 within the bounding volume 20, with other regions of the bounding volume being in shadow with respect to the light 22. As discussed above, the technology described herein relates to arrangements for determining, in effect, the region 23 where light from the light source 22 will be visible, and the regions 24 that will be shadowed from the light source 22.

To facilitate the operation in the manner of the technology described herein, in the present embodiment a cube texture corresponding to the surface of the bounding volume 20 that stores transparency (alpha) values representing the transparency of the surface of the bounding volume 20 is generated.

Figure 3:
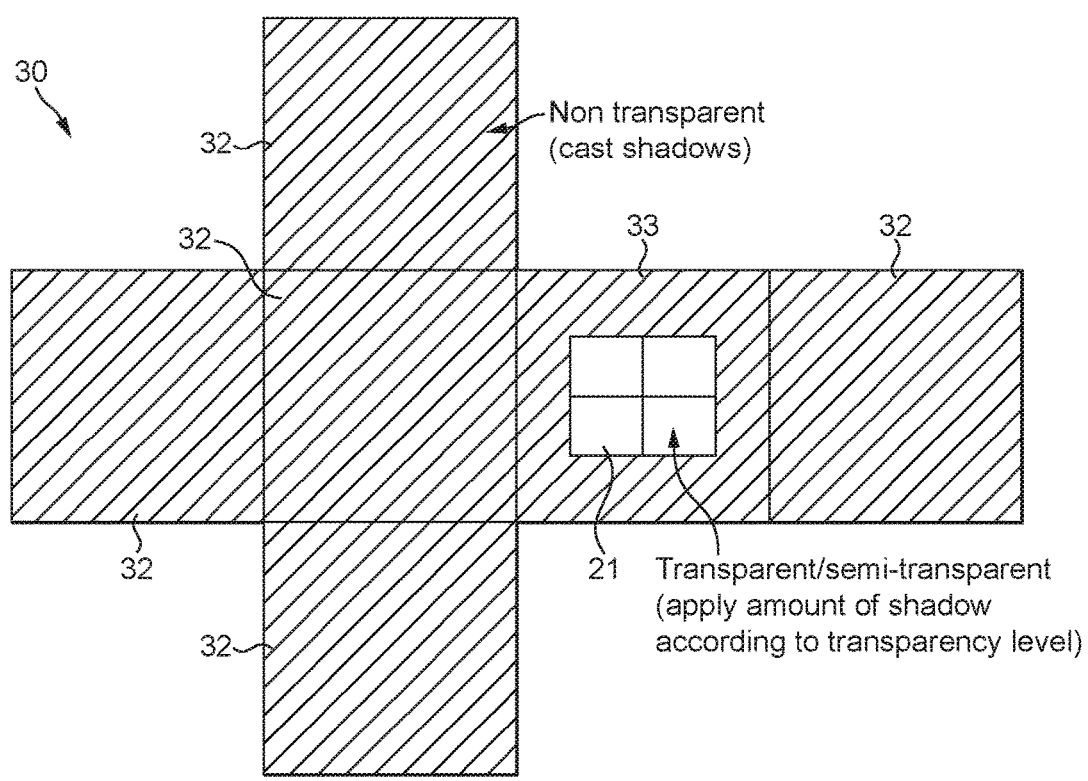
FIG. 3 shows an exemplary texture used in an embodiment of the technology described herein.

FIG. 3 shows the corresponding cube texture 30 for the bounding volume 20 shown in FIG. 2. As shown in FIG. 3, the cube texture 30 will store values indicating non-transparent surfaces for those regions of the bounding volume surface that are opaque, but for the region of the bounding volume surface where the window 21 is present, transparency values indicating transparency (or at least semi-transparency) will be stored. Thus the faces 32 of the cube texture 30 that are opaque will store alpha values of 1, as will the region 33 surrounding the window 21, but the region of the window 21 will store alpha values less than 1 to indicate that that part of the surface of the bounding volume is semi-transparent or completely transparent.

Figure 4:
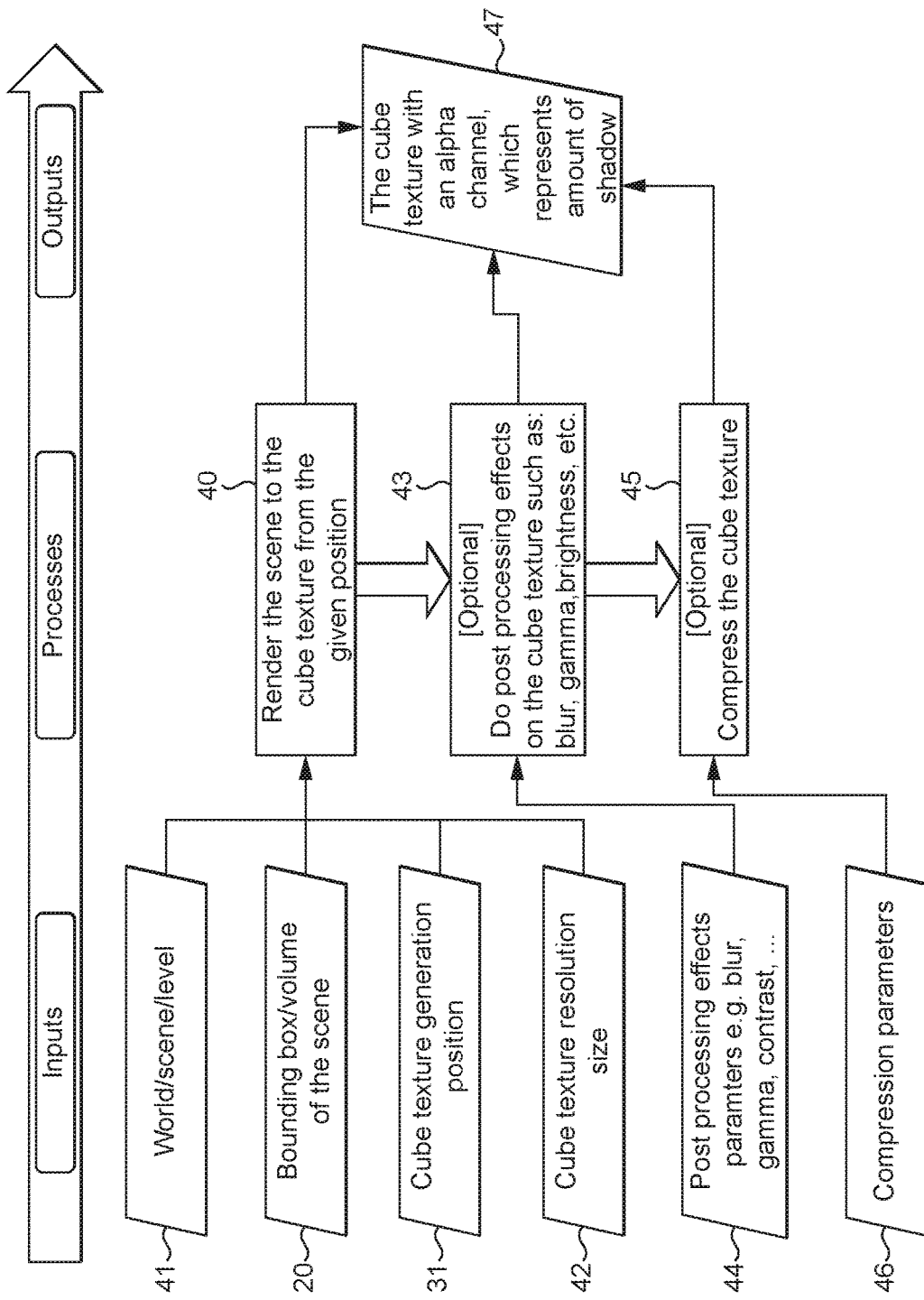
FIG. 4 shows schematically the generation of a texture in an embodiment of the technology described herein.

FIG. 4 shows schematically the generation of the cube texture shown in FIG. 3. As shown in FIG. 4, the process starts by rendering the scene (or at least the alpha values of the scene) to the cube texture from the reference position 31 (shown in FIG. 2) that the cube texture is to be defined with respect to (step 40). (The cube texture 30 will be defined with respect to a reference position 31 (shown in FIG. 2) within the volume that the cube texture represents (thus the bounding volume for the scene), and will be sampled by determining the direction from that reference position that the sampled value (the sampled position) is required for.)

This process uses as its inputs information about the scene 41, information defining the bounding volume 20, information defining the reference position 31 for the cube texture, and information indicating the resolution size 42 that is desired for the cube texture.

The cube texture 30 is generated by rendering an image that will represent the surface of the bounding volume 20 from the viewpoint of the reference position 31 for the texture. To do this respective positions on the surface (the image representing the surface) for the scene (as defined by the scene information 41) are sampled for respective positions on the bounding volume (in the relevant direction from the reference position 31 for the texture). In this process, as the bounding volume will typically be an approximation of the actual scene and so may not match exactly to the surface of the scene (e.g. room) being defined, the points of the surface that are sampled for the texture (for each texel) do not need to fall exactly on the walls of the bounding volume 20 but can be on, outside of or inside the bounding volume. The output 47 of this cube texture generation process is then the cube texture as shown in FIG. 3, having an alpha (transparency) channel which represents the transparency of the surface of the bounding volume for the scene that the cube texture relates to at respective positions on the surface of the bounding volume.

As shown in FIG. 4, once the cube texture has been generated, it may optionally be subjected to various processing effects and optimisations, such as blurring, gamma correction, brightness and/or contrast enhancement, etc. (step 43). This step uses as inputs desired post-processing effect parameters, such as blurring parameters, gamma correction parameters, contrast parameters, etc.

This optimisation processing is possible because the cube texture 30 can be re-used whenever the scene in question is required, and for all external light sources, and does not need to be regenerated dynamically in use, and so non-real-time optimisations that would not be suitable for real-time generation of the cube texture can be used.

Furthermore, as shown in FIG. 4, the generated (and if desired post-processed) cube texture can be compressed (step 45), using desired compression parameters 46. Again this is possible because the cube texture does not need to be generated in real-time. Any suitable texture compression scheme can be used to compress the cube texture.

The cube texture generation and any post-processing/compression of the cube texture can be performed as desired and using any suitable processing system. In an embodiment the cube texture is generated "offline" and stored, and then provided to the graphics processing pipeline for use when it is required. It should also be noted here that no definition of the light or lights is required or used for the cube texture generation.

The use of the cube texture shown in FIG. 3 to determine the effect of shadows cast from the light 22 within the bounding volume 20 will now be described with reference to FIGS. 2, 5, 6 and 7.

Figure 5:
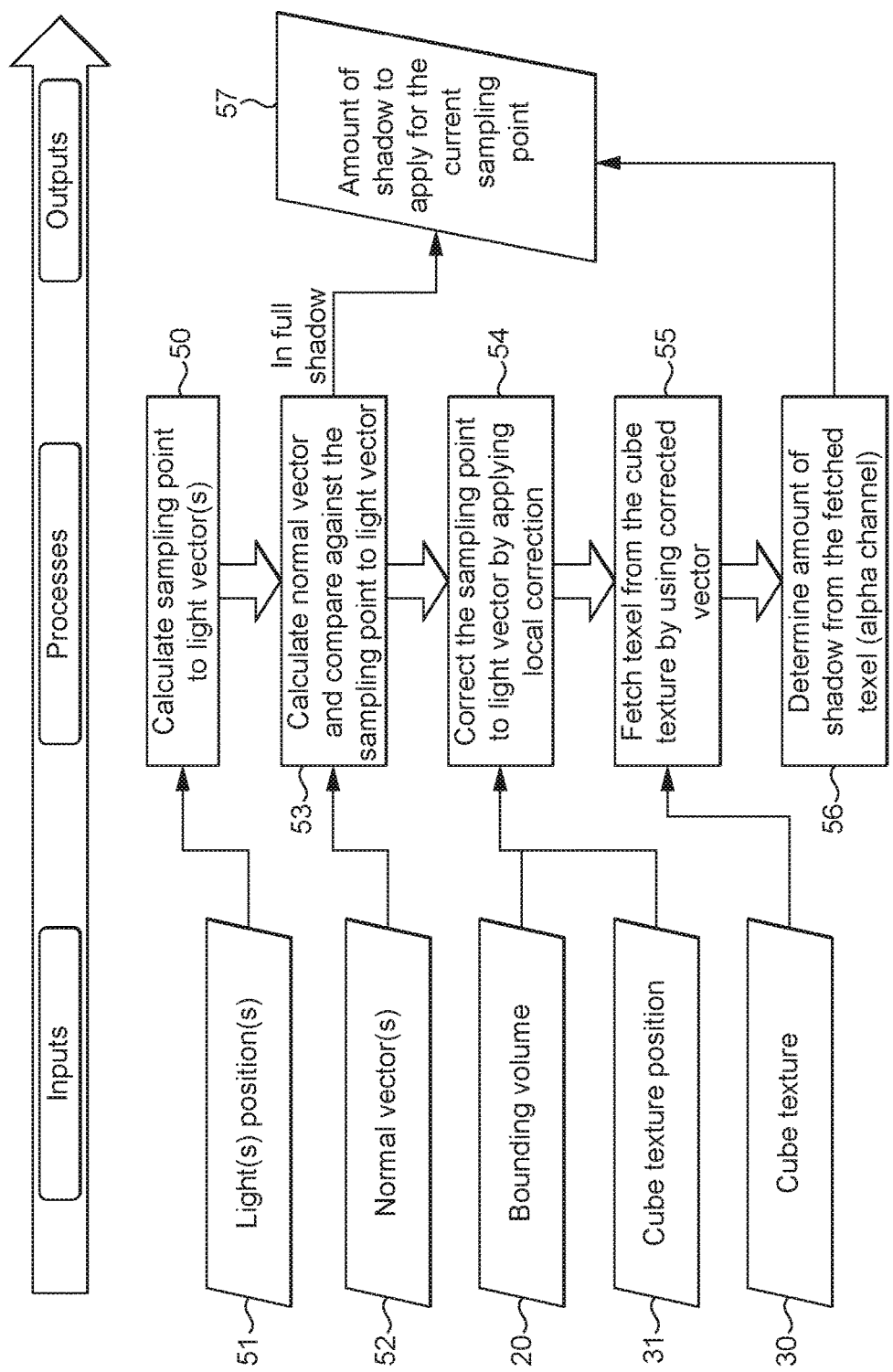
FIGS. 5, 6, and 7 illustrate the operation of an embodiment of the technology described herein.

FIG. 5 shows schematically the main steps of the process.

The present embodiment operates to determine for respective sampling points on or within the bounding volume 20 that are being rendered, the effect, if any, of the light source 22 on the sampling point using the cube texture 30. Essentially, as each primitive for the scene that is on or within the bounding volume 20 is rendered, for each sampling point of the primitive, the process shown schematically in FIG. 5 is performed to determine the effect of the light 22 at the sampling point in question (i.e. to determine, in effect, the amount of shadow to apply to the sampling point in question).

Thus FIG. 5 shows the process for a given sampling point. This process is repeated for each sampling point that is to be processed in the manner of the present embodiment.

As shown in FIG. 5, the process starts by determining the vector 28 from the sampling point 25 on or within the bounding volume that is being considered to the light source 22 (step 50). This process uses as its input the position 51 of the light 22 and the position of the sampling point 25.

In the present embodiment, the vector from the sampling point 25 to the light source 22 is determined by first determining the vectors to the light 22 from the vertices of the primitive that the sampling point relates to, and then interpolating those "vertex to light" vectors to derive the sampling point to light vector 28. These processes are carried out by the vertex shading stage of the fragment frontend operations 8 of the graphics processing pipeline determining the "vertex to light" vectors, and then the interpolation stage of the fragment frontend operations 8 of the graphics processing pipeline interpolating those vertex to light vectors to give the corresponding sampling point to light vector.

The vector 28 from the sampling position to the light is then compared to the normal vector 52 for the primitive that the sampling point 25 relates to, to determine if the primitive that the sampling point belongs to is facing towards or away from the light 22 (step 53).

To facilitate this operation, the vertex shading stage of the fragment frontend operations 8 of the graphics processing pipeline also determines the normal vector for each primitive that is to be processed, and stores those normal vectors such that they are available for use by subsequent stages of the graphics processing pipeline.

Thus, in the present embodiment, the vertex shader (the vertex shading stage) of the fragment frontend operations 8 determines both the vertex to light vectors that are used to determine the sampling point to light vectors and the normal vectors for the primitives.

Figure 6:
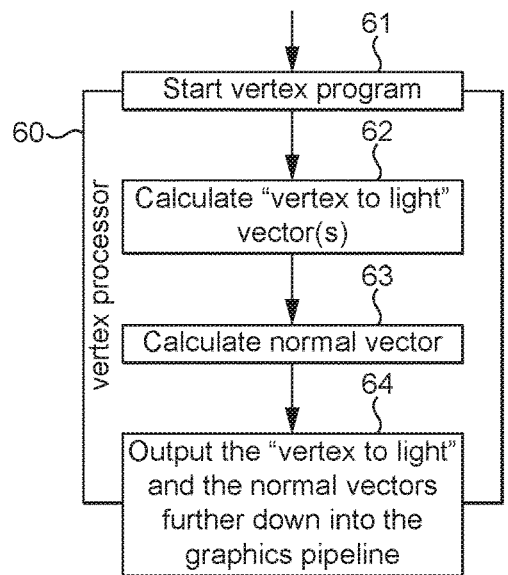

FIG. 6 illustrates this operation, and shows the vertex processor (the vertex shader) 60 of the graphics processing pipeline executing a vertex shading program 61 that is operable to calculate the "vertex to light" vectors for each primitive that is to be considered (step 62), and the normal vectors for each primitive that is to be considered (step 63), and to then output the vertex to light and normal vectors for use by subsequent stages of the graphics processing pipeline (step 64).

The comparison of the normal vector for the primitive that the sampling point relates to the sampling point to light vector determines whether the angle between the normal vector and the sampling point to light vector is greater than 90° or not. If the angle is greater than 90°, then the sampling point lies on a back-facing primitive with respect to the light 22.

If at step 53 it is determined that the sampling point lies on a back-facing primitive with respect to the light 22 (such that the sampling point will be in full shadow from the light 22 whatever the transparency of the bounding volume surface between it and the light 22), then the process simply determines that the sampling position in question will be in full shadow with respect to the light 22 (as shown in FIG. 5).

If it is determined at step 53 that the sampling point in question is facing towards the light 22, then the next step is to apply a "local correction" to the sampling point to light vector to ensure that the correct position within the cube texture 30 is sampled. This is required, because, as can be seen from FIG. 2, for example, the reference position 31 that the cube texture is sampled from (with respect to) may not (and typically will not) correspond to the sampling position 25 being considered, such that simply taking the vector 28 from the sampling point 25 to the light source 22 and using that to sample from the reference position 31 for the cube texture 30 will not sample the correct part of the cube texture.

To apply this "local correction", as shown in FIG. 2, the intersection point 26 on the surface of the bounding volume 20 of the vector 28 from the sampling point 25 to the light 22 is determined, and then the vector 27 from the reference position 31 that the cube texture 30 is defined with respect to the intersection point 26 on the bounding volume 20 is determined, and that vector 27 is then used to sample the cube texture 30 (step 55). This will, accordingly, and as can be seen from FIG. 2, sample the cube texture 30 at the intersection position 26 that corresponds to the portion of the surface of the bounding volume 20 that lies between the sampling point 25 being processed and the light source 22.

The cube texture 30 is then sampled at the position corresponding to the intersection position 26 to determine the alpha value (i.e. the transparency) of the surface of the bounding volume 20 at that point (step 56). The cube texture 30 can be sampled using any desired texture sampling (filtering) process, such as bilinear and/or tri-linear filtering (e.g. in the case where the cube texture 30 is in the form of mipmaps). The filtering may, e.g., be provided by a texturing module (stage) of the graphics processing pipeline. This then gives an alpha value (a transparency value) 57 that is indicative of the amount of shadow to apply to the sampling point 25 in respect of the light source 22.

This output alpha value 57 can then be used as desired (and as required), e.g. in an appropriate lighting calculation, to determine the amount of light that will fall on the sampling point 25 being considered from the light 22, so as to render the sampling point 25 being processed with the appropriate amount of shadow.

In the present embodiment, the comparison of the primitive normal vectors against the sampling point to light angle, the local correction for the sampling point to light vectors and the sampling of the shadow-indicating cube texture 30 and the application of the appropriate shadow effect to the sampling point based on the sampled cube texture 30 transparency value is performed by the fragment shading stage 6 of the graphics processing pipeline.

Figure 7:
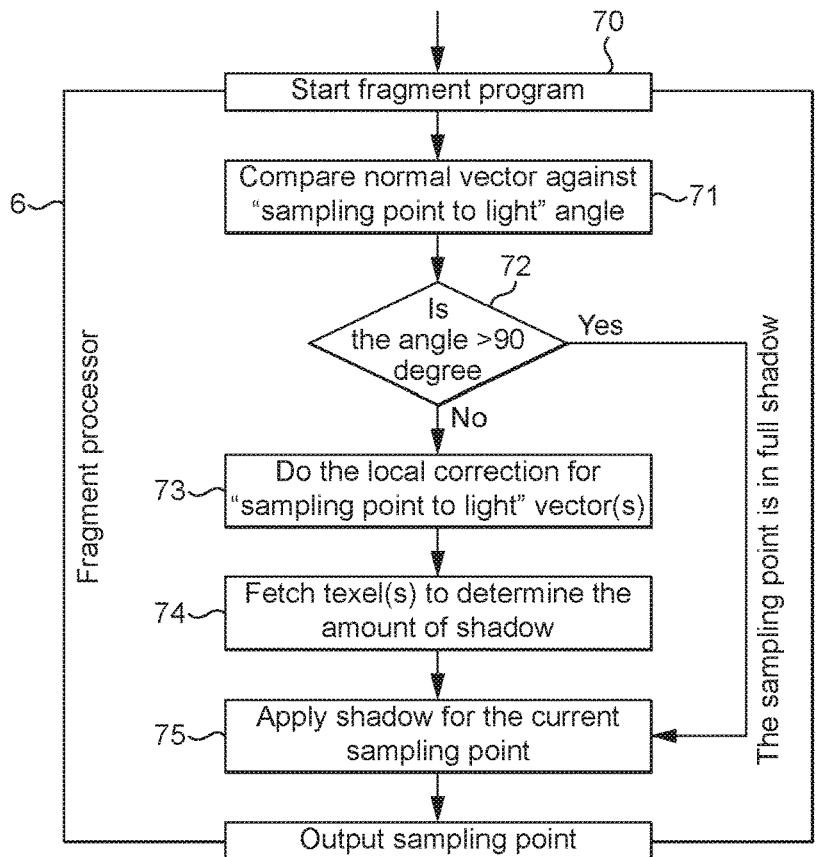

FIG. 7 illustrates this process, and shows that the fragment shading stage 6 executes an appropriate fragment shading program 70 that first compares the primitive normal vector provided by the vertex shader to the sampling point to light vector (step 71). If the comparison reveals that the angle between the normal vector for the primitive that the sampling point relates to and the sampling point to light vector is greater than 90° (step 72), then it is determined that the sampling point will be in full shadow, but if the angle is less than 90°, then the "local" correction for the sampling point to light vector is calculated (step 73), the cube texture is sampled using the corrected sampling point to light vector (step 74), the determined amount of shadow is applied appropriately to the sampling point (step 75), and the so-rendered sampling point is then output (step 76) for use by subsequent stages of the graphics processing pipeline.

This process is then be repeated for the sampling points for all the primitives on or within the bounding volume 20 that are to be rendered (and then for the next frame (if appropriate), and so on).

Various modifications, additions and alternatives to the above-described embodiments of the technology described herein would be possible, if desired.

For example, although the process has been described above with reference to the cube texture 30 storing an alpha value (a transparency value), it would be possible for the cube texture 30 to also store other data channels such as colour channels, with that colour data then also being used in the shadowing process, for example to allow the effect of tinted (coloured) semi-transparent surfaces to be simulated.

In an embodiment, the transparency-indicating textures (thus the cube texture 30) are stored in the form of mipmaps (i.e. where multiple versions of the original texture data array, each having different levels of detail (resolution), are stored for use). In this case, each lower-resolution mipmap level is in an embodiment a downscaled (in an embodiment by a factor of 2) representation of the previous higher resolution mipmap level.

In this case, the texture sampling process in an embodiment also determines which mipmap level or levels (the level of detail) to sample the transparency-indicating texture at. The mipmap level(s) (level of detail) to use is in an embodiment selected based on the distance from the sampling point being considered to the intersection point on the bounding volume of the vector from the sampling point to the light source. Other arrangements would, of course, be possible.

Although the present embodiment has been described with respect to a single external light source 22, the cube texture 30 and bounding volume 20 can be used to determine and simulate the effect of shadows for any arbitrary number of light sources that are external to the bounding volume 20. In this case, the above operation described with reference to the light source 22 would be repeated for each additional external light source separately, with the determined shadowing effects for each external light source then being combined appropriately to provide an overall shadowing effect for all the external light sources at the sampling point being considered.

It would also be possible to combine the process of the technology described herein with other shadow-simulating techniques, for example where there are also light sources within the bounding volume 20.

As can be seen from the above, the technology described herein, in its embodiments at least, provides an effective, and bandwidth efficient, mechanism for simulating the effect of shadows, that, in contrast to existing techniques such as shadow mapping, can use a "static" texture map for determining the effect of shadows, rather than having to use (and constantly regenerate) "dynamic" texture maps for that purpose. This then allows higher quality "shadowing" effects, such as "soft shadows", to be achieved in a bandwidth and processing efficient manner.

This is achieved, in embodiments of the technology described herein at least, by defining a texture map that indicates the transparency of the surface of a bounding volume within a scene to be rendered, and then sampling that texture map to determine a transparency value for applying to light sources that are external to the bounding volume.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system when rendering a scene for output, in which a bounding volume representative of a volume of all or part of the scene to be rendered is defined, the method comprising:

for at least one sampling point on or within the bounding volume, determining a transparency parameter indicative of an amount of shadow cast on the sampling point by a light source that is external to the bounding volume by:

determining a position on the bounding volume intersected by a vector from the sampling point to the light source;

using an intersection position to determine a vector to be used to sample a graphics texture that represents a transparency of a surface of the bounding volume in the scene;

using the determined vector to sample the graphics texture to determine a transparency parameter value indicative of the amount of shadow cast on the sampling point by the light source that is external to the bounding volume;

wherein the graphics texture that represents the transparency of the surface of the bounding volume comprises the graphics texture that indicates and stores for points on a surface that surrounds a reference position within the volume that the graphics texture encompasses, a transparency value for each point;

wherein using the intersection position to determine the vector to be used to sample the graphics texture comprises using the determined intersection position on the bounding volume to determine the vector to the determined intersection position from the reference position; and wherein using the determined vector to sample the graphics texture to determine the transparency parameter value comprises using the determined vector from the reference position to the determined intersection position to sample the graphics texture.

2. The method of claim 1, wherein: the graphics texture is provided as a set of mipmaps; and the method further comprises: determining a mipmap level or levels at which to sample the graphics texture using the distance from the sampling point to the intersection position on the bounding volume of the sampling point to light source vector.

3. The method of claim 1, further comprising: determining whether the sampling point lies on a surface that is facing away from the light source being considered, and when it is determined that the sampling point lies on a back-facing surface with respect to the light source being considered, treating the sampling point as being completely shadowed from the light source, and not sampling the graphics texture.

4. The method of claim 1, further comprising determining for the sampling point on or within the bounding volume the transparency parameter indicative of the amount of shadow cast on the sampling point by the light source that is external to the bounding volume for each of plural light sources that are external to the bounding volume.

5. The method of claim 1, further comprising using the method for determining and simulating effect of shadows.

6. The method of claim 1, further comprising:
generating the graphics texture, the graphics texture comprising an array of texture texels;
setting texel values of the array of texture texels in the graphics texture such that they each store the transparency value representative of the transparency of the surface of the bounding volume that the graphics texture represents in a given direction from the reference position that the graphics texture is to be sampled with respect to; and
storing data representing the texel values of the graphics texture and indicating the reference position that the graphics texture is to be sampled with respect to.

7. The method of claim 6, further comprising subjecting the graphics texture to one or more processing operations after it has been generated.

8. The method of claim 6, further comprising: generating the bounding volume that the graphics texture represents and is to be used with; and storing data representing the bounding volume in association with the graphics texture.

9. The method of claim 1, wherein the graphics texture stores both a transparency data channel and one or more colour data channels.

10. A graphics processing system comprising a graphics processing pipeline comprising:

a plurality of processing stages, including at least a rasteriser that rasterises input primitives to generate graphics fragments to be processed, each graphics fragment having one or more sampling positions associated with it, and a renderer that processes fragments generated by the rasteriser to generate output fragment data;

wherein the graphics processing pipeline is configured to, when rendering a scene for output for which a bounding volume representative of the volume of all or part of the scene to be rendered is defined and in which an external light source that could cast shadows in the bounding volume is present:

for at least one sampling point on or within the bounding volume, determine a transparency parameter indicative of the amount of shadow cast on the sampling point by a light source that is external to the bounding volume by:

determining the position on the bounding volume intersected by a vector from the sampling point to the light source;

using the intersection position to determine a vector to be used to sample a graphics texture that represents the transparency of the surface of the bounding volume in the scene; and using the determined vector to sample the graphics texture to determine a transparency parameter value for the light source for the sampling point indicative of the amount of shadow cast on the sampling point by the light source that is external to the bounding volume;

wherein the graphics texture that represents the transparency of the surface of the bounding volume comprises the graphics texture that indicates and stores for points on a surface that surrounds a reference position within the volume that the graphics texture encompasses, a transparency value for each point;

wherein the processing circuitry is configured to use the intersection position to determine the vector to be used to sample the graphics texture by using the determined intersection position on the bounding volume to determine the vector to the determined intersection position from the reference position, and to use the determined vector to sample the graphics texture by using the determined vector from the reference position to the determined intersection position to sample the graphics texture.

11. The graphics processing system of claim 10, wherein: the graphics texture is provided as a set of mipmaps; and the processing circuitry is configured to:
determine a mipmap level or levels at which to sample the graphics texture using the distance from the sampling point to the intersection position on the bounding volume of the sampling point to light source vector.

12. The graphics processing system pipeline of claim 10, wherein the processing circuitry is configured to:

determine whether the sampling point lies on a surface that is facing away from the light source being considered, and to, when it is determined that the sampling point lies on a back-facing surface with respect to the light source being considered, treat the sampling point as being completely shadowed from the light source, and not sample the graphics texture.

13. The graphics processing system of claim 10, wherein the processing circuitry is configured to:

determine for the sampling point on or within the bounding volume, the transparency parameter indicative of the amount of shadow cast on the sampling point by the light source that is external to the bounding volume, for each of plural light sources that are external to the bounding volume.

14. The graphics processing system of claim 10, wherein the processing circuitry is configured to: use one or more other techniques for determining and simulating effect of shadows.

15. The graphics processing system of claim 10, further comprising processing circuitry configured to:
generate the graphics texture, the graphics texture comprising an array of texture texels;
set texel values of the array of texture texels in the graphics texture such that they each store the transparency value representative of the transparency of the surface of the bounding volume that the graphics texture represents in a given direction from the reference position that the graphics texture is to be sampled with respect to; and
store data representing the texel values of the graphics texture and indicating the reference position that the graphics texture is to be sampled with respect to.

16. The graphics processing system of claim 15, wherein the processing circuitry is configured to:
subject the graphics texture to one or more processing operations after it has been generated.

17. The graphics processing system of claim 15, wherein the processing circuitry is configured to:
also generate the bounding volume that the graphics texture represents and is to be used with; and
store data representing the bounding volume in association with the graphics texture.

18. The graphics processing system of claim 10, wherein the graphics texture stores both a transparency data channel and one or more colour data channels.

19. A non-transitory computer readable storage medium storing computer software code which when executing on a processor performs a method of operating a graphics processing system when rendering a scene for output, in which a bounding volume representative of the volume of all or part of the scene to be rendered is define, the method comprising:
for at least one sampling point on or within the bounding volume, determining a transparency parameter indicative of an amount of shadow cast on the sampling point by a light source that is external to the bounding volume by:
determining a position on the bounding volume intersected by a vector from the sampling point to the light source;
using the intersection position to determine a vector to be used to sample a graphics texture that represents a transparency of a surface of the bounding volume in the scene; and
using the determined vector to sample the graphics texture to determine a transparency parameter value indicative of the amount of shadow cast on the sampling point by the light source that is external to the bounding volume;
wherein the graphics texture that represents the transparency of the surface of the bounding volume comprises the graphics texture that indicates and stores for points on a surface that surrounds a reference position within the volume that the graphics texture encompasses, a transparency value for each point; and
wherein using the intersection position to determine the vector to be used to sample the graphics texture comprises using the determined intersection position on the bounding volume to determine the vector to the determined intersection position from the reference position; and
wherein using the determined vector to sample the graphics texture to determine the transparency parameter value comprises using the determined vector from the reference position to the determined intersection position to sample the graphics texture.

* * * * *